US006685326B2

(12) United States Patent
Debevec et al.

(10) Patent No.: US 6,685,326 B2
(45) Date of Patent: Feb. 3, 2004

(54) REALISTIC SCENE LIGHTING SIMULATION

(75) Inventors: Paul E. Debevec, Marina del Rey, CA (US); Timothy S. Hawkins, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/165,371

(22) Filed: Jun. 7, 2002

(65) Prior Publication Data

US 2002/0186555 A1 Dec. 12, 2002

Related U.S. Application Data

(60) Provisional application No. 60/296,926, filed on Jun. 8, 2001.

(51) Int. Cl.[7] ............................................... G03B 15/07
(52) U.S. Cl. ............................................. 362/11; 362/5
(58) Field of Search ................................. 362/233, 250, 362/276, 5, 11; 345/426

(56) References Cited

U.S. PATENT DOCUMENTS

| 5,704,702 A | 1/1998 | Goto |
| 5,894,309 A | 4/1999 | Freeman et al. |
| 6,018,350 A | 1/2000 | Lee et al. |
| 6,313,842 B1 | 11/2001 | Tampieri |

OTHER PUBLICATIONS

Haeberli, P. Synthetic Lighting for Photography (Jan. 1992).
Debevec, P. et al. Acquiring the Reflectance Field of a Human Face (SIGGRAPH 2000 Conference Proceedings).

*Primary Examiner*—Sandra O'Shea
*Assistant Examiner*—Guiyoung Lee
(74) *Attorney, Agent, or Firm*—McDermott, Will & Emery

(57) ABSTRACT

A lighting simulation process for simulating the lighting of a subject at a location in a scene. Scene illumination data is created that specifies the illumination that the scene provides at the location at which the subject is to be simulated from a plurality of spatial directions. Subject illumination data is created that specifies the appearance of the subject when illuminated from a plurality of different spatial directions. The subject is then illuminated as if at the location in the scene by combing the scene illumination data with the subject illumination data.

31 Claims, 3 Drawing Sheets

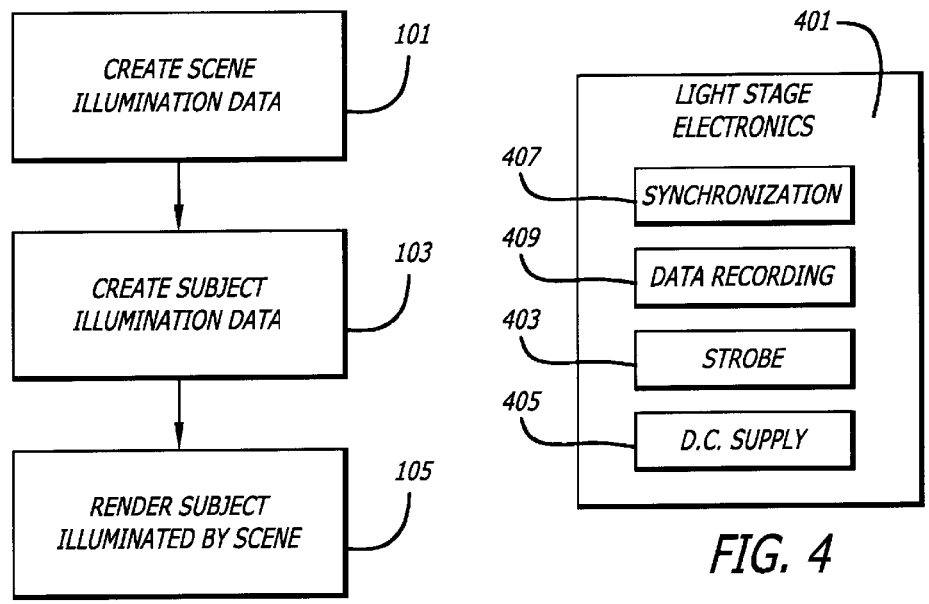
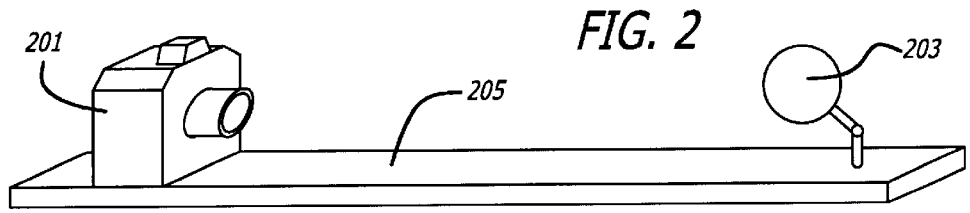
FIG. 2
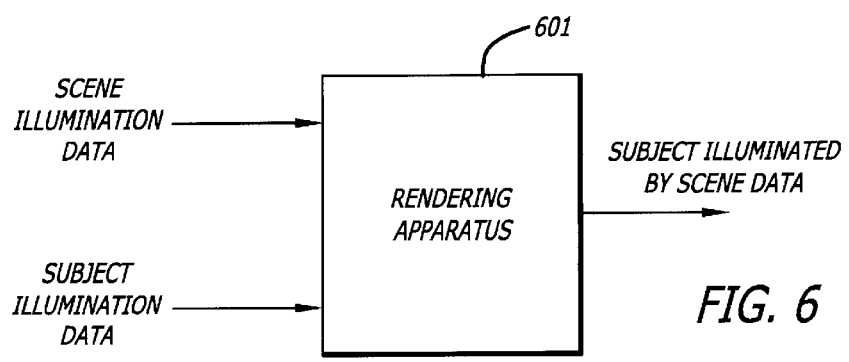
FIG. 6

REALISTIC SCENE LIGHTING SIMULATION

CROSS REFERENCES TO RELATED APPLICATIONS

This application is related to and claims the benefit of the filing date of U.S. provisional application Ser. No. 60/296,926, filed Jun. 8, 2001. The content of this provisional application is incorporated herein by reference, as well as all of the references that are cited therein.

BACKGROUND OF INVENTION

1. Field of the Invention

This invention relates to photography and, more specifically, to the simulation of real lighting conditions.

2. Description of Related Art

There are numerous situations when the lighting in a scene needs to be duplicated.

One such situation is when the scene is photographed separately from the subject. In this situation, the photographs of the subject and the scene must be composited. A realistic composite usually requires the subject to be lit as if the subject was in the scene, including all of the spatial variations in the light that are present at the location in the scene at which the subject is to be inserted.

This is a challenging task. It is made even more challenging by the fact that many scenes have complex spatial variations in their light. Examples include a forest, cathedral, museum or candlelit hut. Making the composite look as though the subject is actually in such a scene is particularly difficult with complex subjects such as the human face. Adding to the difficulty is the fact that viewers are extremely sensitive to the appearance of people's faces.

It is also often desirable to make a subject appear as though it were in the lighting provided by a particular scene, even though the subject is not composited with that scene. For example, it is sometimes useful to make a cultural artifact appear as though it was present in a complex lighting environment, such as a cathedral.

Unfortunately, existing technologies are not able to realistically simulate the complex lighting that is often present in a scene on a subject that is not in that scene.

SUMMARY OF INVENTION

One object of the invention is to obviate this as well as other problems in the prior art.

Another object of the invention is to make a subject appear as though it was being lit by the complex lighting in a scene-including the colors, intensities and spatial directions of light in that scene-even though the subject was never in that scene.

Another object of the invention is to realistically simulate the casting of scene lighting on a perspective of a subject that is not present in the scene that is different from perspectives of the subject that have been photographed.

Another object of the invention is to make a subject appear as though it was lit by the complex light in a virtual scene.

These as well as still further features, objects and benefits of the invention are obtained by a lighting simulation process and apparatus that simulates the lighting of a subject at a location in a scene.

In one embodiment, scene illumination data is created. The scene illumination data specifies the illumination that the scene provides at the location at which the subject is to be simulated from a plurality of spatial directions. Subject illumination data is also created. The subject illumination data specifies the appearance of the subject when illuminated from a plurality of different spatial directions. The subject is then rendered illuminated as if at the location in the scene by combining the scene illumination data with the subject illumination data.

In one embodiment, the scene illumination data specifies both the intensity and color of the illumination from each of a plurality of spatial directions.

In one embodiment, the rendering is accomplished by separately multiplying the value of each pixel in the subject illumination data for each spatial direction by the illumination value in the scene illumination data from that same spatial direction and summing the results over all of the spatial directions.

In one embodiment, each pixel contains values specifying both its color and intensity.

In one embodiment, the subject illumination data is created by illuminating the subject with a small light directed toward the subject from a first spatial direction; photographing the appearance of the subject under the illumination of the light from the first spatial direction; illuminating the subject by a small light directed towards the subject from a second spatial direction different from the first spatial direction; and photographing the appearance of the subject under the illumination of the light from the second spatial direction. In one embodiment, the two last steps that were just recited are repeated for additional spatial directions, each different from all of the others, until the totality of spatial directions from which the subject is illuminated and photographed approximates evenly-spaced locations on a sphere or dome.

In one embodiment, the small light is substantially white in color.

In one embodiment, a single light source is used to illuminate the subject from each spatial direction, and the light source is successively moved to illuminate the subject from each spatial direction after each photographing.

In one embodiment, the light source is moved in a spiral path.

In one embodiment, the spots of light are generated by an array of sequentially-fired light sources mounted on an arm that rotates around the subject.

In one embodiment, the subject illumination data specifies the appearance of the subject from a single view point.

In one embodiment, the subject illumination data specifies the appearance of the subject from a plurality of different viewpoints. In one embodiment, the subject is rendered from a viewpoint that is different from any of the viewpoints specified by the subject illumination data. This is accomplished by extrapolating from the viewpoints that are specified by the subject illumination data.

In one embodiment, the subject includes a human face.

In one embodiment, the subject includes a cultural artifact.

The invention also includes subject illuminating data gathering apparatus for creating subject illumination data used in a lighting simulation process for simulating the lighting of the subject at a location in a scene.

In one embodiment, the lighting apparatus sequentially illuminates the subject with a small light from a sequence of different spatial directions. A camera takes a photograph of the subject when illuminated from each spatial direction. A recorder records each photograph and information indicating the spatial direction from which the subject was illuminated at the time of each photograph.

In one embodiment, the lighting apparatus includes a light and movement apparatus that moves the light to each spatial direction. In one embodiment, the moving apparatus moves the light in a spiral path.

In one embodiment, the lighting apparatus includes an arm, a plurality of lights mounted on the arm, location apparatus connected to the arm that rotates the arm, and a strobing circuit that sequentially fires each light on the arm as it rotates.

In one embodiment, the arm is semi-circular.

In one embodiment, the spatial directions substantially approximate evenly-spaced locations on a sphere or dome.

In one embodiment, the small light is substantially white.

In one embodiment, the subject illumination data gathering apparatus includes a plurality of cameras, each for taking a photograph of the subject when illuminated from each spatial direction from a viewpoint different from the viewpoints photographed by the other cameras.

In one embodiment, the recorder also records information indicative of the identity of the camera that took each photograph.

In one embodiment, the lighting apparatus includes a plurality of strobe lights and a D.C. power supply for supplying pulses of D.C. power to the strobe lights.

In one embodiment, the subject illumination data gathering apparatus includes subject-stabilizing apparatus for helping the subject remain still during the photographing. In one embodiment, the subject-stabilizing apparatus includes a headrest.

The invention also includes computer-readable media containing computer programming instructions which, when loaded in a computer system, cause the computer system to render a subject illuminated as though at a location in a scene by combining subject illumination data specifying the appearance of the subject when illuminated from a plurality of different spatial directions with scene illumination data specifying the illumination that the scene provides at a location at which the subject is to be illuminated from a plurality of spatial directions.

These as well as still further features, objects and benefits of the invention will now become apparent from a review of the following detailed description of illustrative embodiments and the accompanying drawings.

BRIEF DESCRIPTION OF DRAWINGS

FIG. 1 is a block diagram of a process implemented by one embodiment of the invention.

FIG. 2 is an illustration of a light probe that can advantageously be used to generate the scene illumination data that is used in one embodiment of the invention.

FIG. 4 is a block diagram of electronics that can advantageously be used to generate the subject illumination data that is used in one embodiment of the invention.

FIG. 6 is a block diagram of a rendering apparatus that can advantageously used in one embodiment of the invention to render the subject illuminated as if at the location in the scene.

DETAILED DESCRIPTION OF ILLUSTRATIVE EMBODIMENTS

Figure 3:
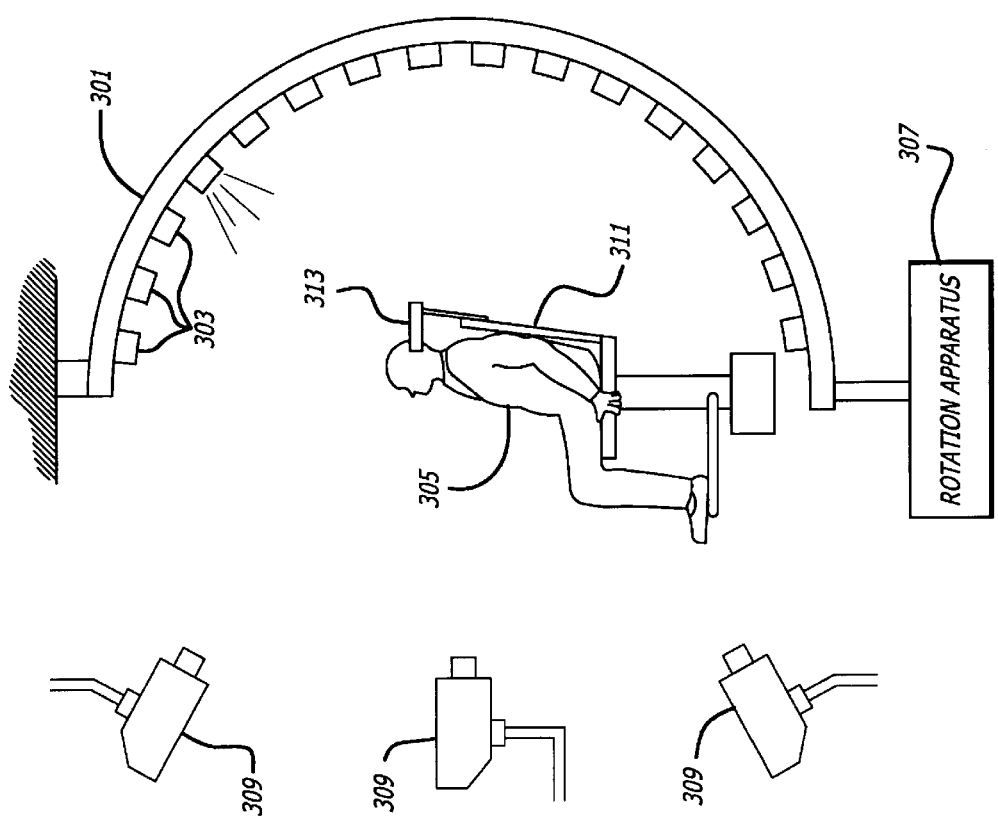
FIG. 3 is an illustration of a light stage that can advantageously be used to generate the subject illumination data that is used in one embodiment of the invention.

The invention makes a subject appear as though it is being lit by the complex lighting in a scene—including the colors, intensities and spatial directions of that light—even though the subject was never in that scene.

FIG. 1 is a block diagram of a process implemented by one embodiment of the invention. First, scene illumination data is created in a Create Scene Illumination Data step 101. Either before, during or after step 101, subject illumination data is created in a Create Subject Illumination Data step 103. The subject is then rendered as though it was illuminated by the scene in a Render Subject Illuminated by Scene step 105

Illustrative embodiments of sub-processes and apparatuses used in connection with each of these steps will now be described.

The goal of the Create Scene Illumination Data step 101 is to generate data that represents all or samplings of the incident illumination at the point in the scene at which the subject is to be rendered. This preferably includes information about the intensity, color and spatial direction of the incident illumination. Color could be excluded in embodiments only requiring a gray scale rendering.

The scene illumination data that is created can be representative of the incident illumination at a point in an actual scene or the incident illumination at a point in a virtual scene.

FIG. 2 is an illustration of a light probe that can advantageously be used to generate the scene illumination data that is used in one embodiment to the invention. In this embodiment, the incident illumination from an actual scene is gathered.

This is accomplished by focusing a camera 201 on a curved reflective surface, such as the silver ball 203, both of which are affixed to a mount 205. As is well known, the metal ball 203 will reflect the incident illumination from most spherical directions. A two-dimensional image of this three-dimensional reflection is then taken by the camera 201. From this, data representative of the intensity and color of incident illumination from substantially all spatial directions at the point of the silver ball 203 can be extracted. Further details about this process and structure are described in Debevec, P.

"Rendering Synthetic Objects into Real Scenes; Bridging Traditional Image-Based Graphics with Global Illumination and High Dynamic Range Photography," In Proceedings SIGGRAPH 1998 (July 1998) Computer Graphics Proceedings, Annual Conference Series, pp. 189–198 (July 1998, Orlando, Fla.) (Addison Wesley) (edited by Michael Cohen) (ISBN 0-89791-999-8), the content of which (including the references cited therein) is incorporated herein by reference.

There are, of course, several other ways to generate the scene illumination data. For example, a plurality of cameras focused in different directions could be used. A single camera could also be used to sequentially capture the illumination from several spatial directions. One or more of these cameras could also be fitted with a fish-eye lens.

As also shown in FIG. 1, another step in one embodiment of the invention is to create the subject illumination data, as reflected in the Create Subject Illumination Data step 103 shown in FIG. 1. This can be done before, after or during the Create Scene Illumination Data step 101. What is desired here is to create data that captures the appearance of the subject when illuminated by a spotlight source from each of several spatial directions. In one embodiment, these spatial directions substantially approximate evenly-spaced locations on a sphere or dome. In one embodiment, the small light source is substantially white in color.

FIG. 3 is an illustration of a light stage that can advantageously be used to generate the subject illumination data that is used in one embodiment of the invention. As shown in FIG. 2, the light stage includes an arm 301 containing a plurality of strobe lights, one of which is designated by numeral 303, mounted to the arm 301 and directed to a subject 305. It also includes a rotation apparatus 307 and one or more cameras 309.

The arm 301 can take many shapes, but is preferably semi-circular and having a sufficient diameter to allow the subject 305 to fit within its interior. For many human subjects, about 3 meters works well. The strobe lights 303 are preferably lights that can be quickly flashed, such as Xenon strobe lights. Although any number can be mounted on the arm 301, about 30 appear to work well.

The rotation apparatus 307 is typically a motor-driven apparatus that is coupled to the arm 301 and, when activated, causes the arm 301 to rotate about a single vertical axis around the subject 305. One complete revolution is all that is typically needed to record the subject illumination data.

Any rotation speed can be used. However, rotation speeds that are very slow create a greater opportunity for the subject 305 to move during the photographing process (described below). Conversely, the speed must not be so great as to make it impossible for the camera(s) 309 to record images at the rate needed. In one embodiment, a full rotation is accomplished in approximately four seconds.

The camera(s) 309 must be able to rapidly take photographs of the subject 305 as the subject is being lit by each different strobe light 303 at numerous positions during the rotation of the arm 301. Although a framing rate of 30 frames per second will work, faster frame rates reduce the amount of time that the subject 305 must remain still.

The camera(s) 309 can be any of a broad variety of cameras that are used to take multiple photographs spaced closely together. In one embodiment, a CCD video motion camera is used.

The camera 309 is preferably fixed to a mount (not shown) and focused on all or a portion of the subject 305, such as the subject's face. If desired, a plurality of cameras 309 can be used, each focused on the subject from a different viewpoint (or focused on a different portion of the subject), as shown in FIG. 3. As will be seen below, this can facilitate the creation of perspectives of the subject during the simulation process that have not been photographed.

Thus far, the camera(s) 309 and subject 305 have been described as remaining stable, while the arm 301 rotates during the photographing process. It is of course to be understood that the reverse will also work, i.e., the camera(s) 309 and subject 305 could rotate in synchronism (by, for example, being placed on a rotating stage) while the arm 301 remains stationary.

FIG. 4 is a block diagram of electronics that can advantageously be used to generate the subject illumination data that is used in one embodiment of the invention. Although it will now be discussed in conjunction with the apparatus shown in FIG. 3, it is to be understood that the electronics shown in FIG. 4 can also advantageously be used in connection with other configurations, such as the lighting apparatus that will be discussed below in connection with FIG. 5.

Light stage electronics 401 in FIG. 4 preferably includes strobe circuitry 403. The strobe circuitry 403 is in communication with the strobe lights 303 on the arm 301 in FIG. 3. The strobe circuitry 403 causes each of the strobe lights 303 to flash in sequence as the arm 301 rotates.

The rate of flashing can vary markedly. However, if the rate is too slow, it may be difficult for the subject 305 to remain still throughout the photographing process. On the other hand, the rate usually should not be greater than the frame rate of the camera(s) 309.

A D.C. supply 405 is advantageously used in connection with the strobe circuitry 403 to supply power to the strobe lights 303. A.C. supply systems may not work well. The time required for the A.C. supply system to recharge often limits the strobe rate. The use of an A.C. supply systems also makes it hard to control the intensity of each strobe light.

In order to use the D.C. supply 405, however, the strobe circuitry 403 requires additional circuitry to shut off the current after each light has been strobed. Otherwise, the current will continue to flow in the strobe light.

Synchronization circuitry 407 may control the rotation apparatus 307 and the strobe circuitry 403 so that the rotation of the arm 307 and strobing of the strobe lights 303 are synchronized. The synchronization circuitry 407 is also in communication with the camera(s) 309, insuring that the shutter of the camera(s) 309 is synchronized with the strobing of the strobe lights 303. A C180-based single board computer can advantageously be used to implement this function. The strobe lights 303 are repeatedly strobed in sequence as the arm 301 rotates around the subject. The synchronization circuitry 407 causes the camera(s) 309 to take a photograph of the subject 305 each time a strobe light 303 flashes.

A data recording system 409 records each image that was taken by the camera(s) 309, as well as the spatial direction at which the subject 305 was illuminated at the time each photograph was taken. The recording can be done in the analog or digital domain using magnetic tape, memory devices or any other type of picture recording technology. The needed spatial direction information can advantageously be obtained from the synchronization circuitry 407, from sensors (not shown), or from any other technology that is tracking the location in three dimensional space of the strobe light 303 that is being strobed.

In one embodiment, the invention includes apparatus that helps the subject 305 remain stable during the photographing process. This can include a chair 311 to which a head rest 313 is affixed. When photographing a subject other than a human, such as a cultural artifact, a table could instead advantageously be used as a stabilizing device.

In one embodiment, the subject illumination data that is recorded by the data recording system 409 includes a set of pixel values from each picture that is taken by the camera(s) 309, including, in certain embodiments, information indicative of the color and intensity of each pixel.

Figure 5:
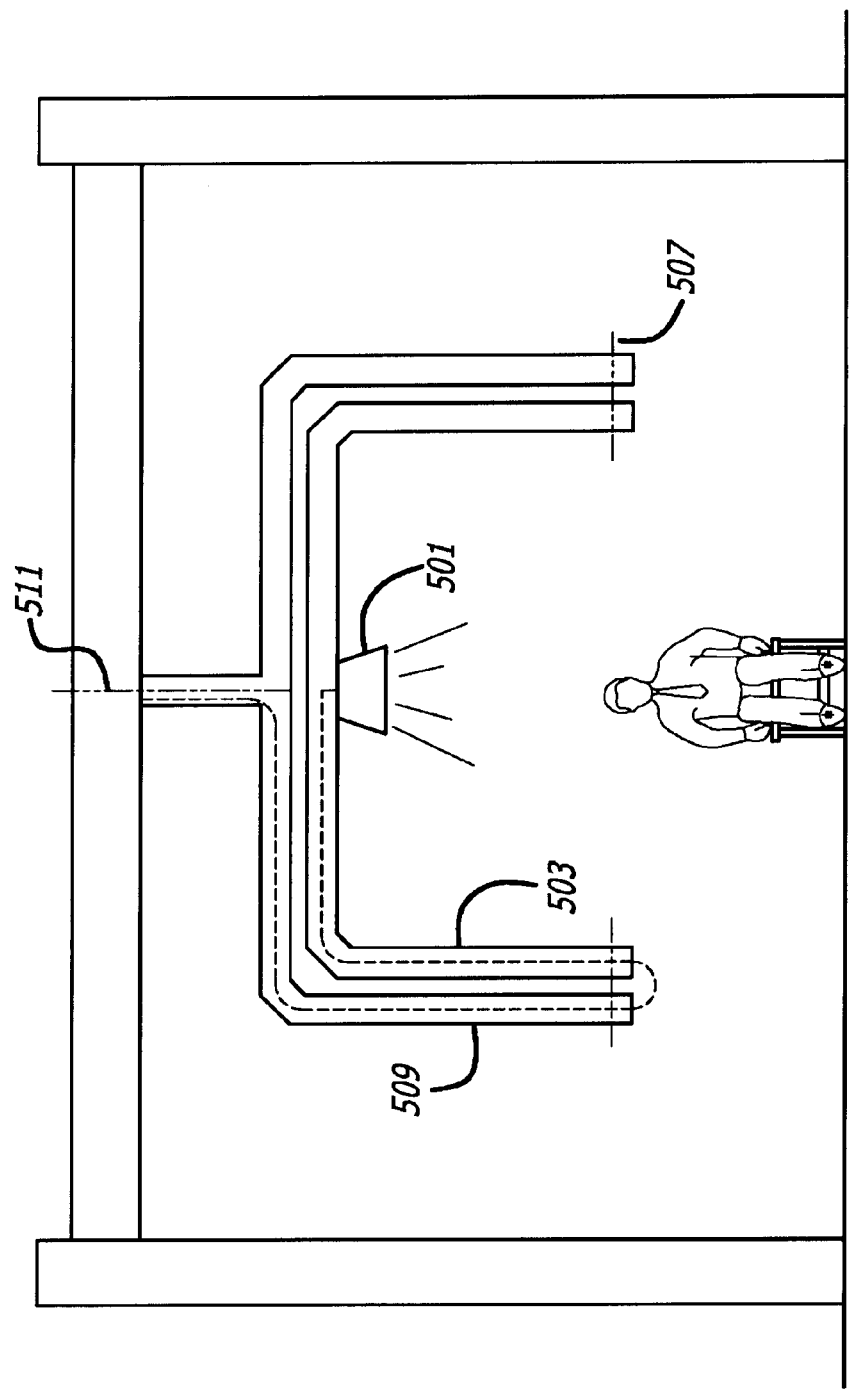
FIG. 5 is an illustration of an alternate lighting apparatus that can be used to generate the subject illumination data that is used in one embodiment of the invention.

FIG. 5 is an illustration of an alternate lighting apparatus that can be used to generate the subject illumination data that is used in one embodiment of the invention. As shown in FIG. 5, a single spotlight 501 is affixed to an interior rotating arm 503 that is driven by rotating apparatus (not shown) to controllably-rotate around a horizontal axis 507 and an exterior rotating arm 509 that is driven by a rotating apparatus (not shown) to controllably-rotate around a vertical axis 511. By appropriate controls on the rotating apparatuses, the spotlight 501 is caused to travel through a spiral path around the subject during the photographing process. As should now be apparent, electronics similar to the light stage electronics 401 shown in FIG. 4 can advantageously be used to control the first and second rotating apparatuses 505 and 509, as well as to energize the spotlight 501. And, of course, a vast array of other systems could be used to move the single spotlight 501 through a spiral path or, for that matter, other paths.

With this embodiment, synchronization between the shutter of the camera(s) 309 and the strobing of the lights is not needed. Instead, the spotlight 501 can remain on throughout the scanning process. On the other hand, it may be more difficult to track the precise spatial direction of the spotlight 501 in the vertical plane with this configuration, and the mechanical sluggishness of the vertical movement of the spotlight 501 may increase the time during which the subject 305 must remain stationary.

As shown in FIG. 1, the third step of the process is to render the subject illuminated as if it was in the scene, as reflected by the Render Subject Illuminated By Scene step 105. FIG. 6 is a block diagram of a rendering apparatus that can advantageously used in one embodiment of the invention to render the subject illuminated as if at the location in the scene.

In one embodiment, the illumination value of the red, green and blue component of each pixel in each photograph of the subject under the illumination of a light from a particular spatial direction is multiplied by the corresponding value of the illumination in the scene from substantially that same spatial direction. The results of the multiplications for the color channels of the pixel in all of the spatial directions are then summed together to obtain the simulated illumination of the pixel by the scene. In essence, the subject is rendered illuminated as though it were at the specified location in the scene by summing all of the different multiplied photo data sets together, thus effectively summing the effect of all of the incident illuminations in the scene from all of the spatial directions. A rendering apparatus 601 using hardware and software that implements this function can be used for this purpose.

When multiple cameras are used to create the subject illumination data, extrapolations between the images that are taken of the subject between the multiple cameras can be made to create subject illumination data perspectives that were not photographed. This can be done using well-known extrapolation techniques, including, in one embodiment the casting of gridlines on the subject as part of the photographing process. Another embodiment uses image correspondence techniques to determine intermediate mapping between the subject illumination images. Novel perspectives can then be illuminated as though they were in the scene using the same techniques as were described above.

Although certain embodiments of the invention have now been described, it is of course to be understood that the invention is equally applicable to a vast array of additional and different embodiments. In short, the invention is limited solely to the claims that now follow and their equivalents.

We claim:

1. A lighting simulation process for simulating the lighting of a subject at a location in a scene comprising:
    a) creating scene illumination data specifying the illumination that the scene provides at the location at which the subject is to be simulated from a plurality of spatial directions;
    b) creating subject illumination data specifying the appearance of the subject when illuminated from a plurality of different spatial directions; and
    c) rendering the subject illuminated as if at the location in the scene by combining the scene illumination data with the subject illumination data.

2. The lighting simulation process of claim 1 wherein the scene illumination data specifies the intensity and color of the illumination from each of the plurality of spatial directions.

3. The lighting simulation process of claim 1 wherein the subject illumination data is multiplied by the scene illumination data during said rendering.

4. The lighting simulation process of claim 3 wherein:
    a) the scene illumination data includes pixel values;
    b) the subject illumination data includes pixel values; and
    c) pixel values of the subject illumination data from each spatial direction are multiplied by the pixel values of the scene illumination data from substantially the same spatial direction and summed over all spatial directions.

5. The lighting simulation process of claim 4 wherein each pixel contains values specifying color and intensity.

6. The lighting simulation process of claim 1 wherein said creating subject illumination data includes:
    a) illuminating the subject with a small light directed towards the subject from a first spatial direction;
    b) photographing the appearance of the subject under the illumination of the light from the first spatial direction;
    c) illuminating the subject by a small light directed towards the subject from a second spatial direction different from the first spatial direction; and
    d) photographing the appearance of the subject under the illumination of the light from the second spatial direction.

7. The lighting simulation process of claim 6 wherein steps (c) and (d) are repeated for additional spatial directions, each different from all of the others, until the totality of spatial directions from which an illuminating small light is directed approximates evenly-spaced locations on a sphere or dome.

8. The lighting simulation process of claim 7 wherein the spots of light are generated by an array of sequentially-fired light sources mounted on an arm that rotates around the subject.

9. The lighting simulation process of claim 6 wherein the small light is substantially white in color.

10. The lighting simulation process of claim 6 wherein:
    a) a single light source is used to illuminate the subject from each spatial direction; and
    b) the light source is successively moved to illuminate the subject from each spatial direction after each photographing.

11. The lighting simulation process of claim 10 wherein the light source is moved in a spiral path.

12. The lighting simulation process of claim 1 wherein the subject illumination data specifies the appearance of the subject from a single viewpoint.

13. The lighting simulation process of claim 1 wherein the subject illumination data specifies the appearance of the subject from a plurality of different viewpoints.

14. The lighting simulation process of claim 13 wherein said rendering the subject renders the subject from a viewpoint different from any of the viewpoints specified by the subject illumination data by extrapolating from the viewpoints that are specified by the subject illumination data.

15. The lighting simulation process of claim 1 wherein the subject includes a human face.

16. The lighting simulation process of claim 1 wherein the subject includes a cultural artifact.

17. A lighting simulation process for simulating the lighting of a subject at a location in a scene comprising:
   a) creating subject illumination data specifying the appearance of the subject when illuminated from a plurality of different spatial directions; and
   b) rendering the subject illuminated as if at the location in the scene by combining the subject illumination data with scene illumination data specifying the illumination that the scene provides at the location at which the subject is to be simulated from a plurality of spatial directions.

18. A lighting simulation process for simulating the lighting of a subject at a location in a scene comprising rendering the subject illuminated as if at the location in the scene by combining scene illumination data specifying the illumination that the scene provides at the location at which the subject is to be simulated from a plurality of spatial directions with subject illumination data specifying the appearance of the subject when illuminated from a plurality of different spatial directions.

19. Subject illumination data gathering apparatus for creating subject illumination data used in a lighting simulation process for simulating the lighting of the subject at a location in a scene comprising:
   a) lighting apparatus for sequentially illuminating the subject with a small light from a sequence of different spatial directions;
   b) a camera for taking a photograph of the subject when illuminated from each spatial direction; and
   c) a recorder for recording each photograph and information reflecting the spatial direction from which the subject was illuminated at the time of each photograph.

20. The subject illumination data gathering apparatus of claim 19 wherein said lighting apparatus includes:
   a) a light; and
   b) movement apparatus that moves said light to each spatial direction.

21. The subject illumination data gathering apparatus of claim 20 wherein said moving apparatus moves said light in a spiral path.

22. The subject illumination data gathering apparatus of claim 19 wherein said lighting apparatus includes:
   a) an arm;
   b) a plurality of lights mounted on said arm;
   c) rotation apparatus connected to said arm that rotates said arm; and
   d) a strobing circuit that sequentially-fires each light on said arm as it rotates.

23. The subject illumination data gathering apparatus of claim 22 wherein said arm is semicircular.

24. The subject illumination data gathering apparatus of claim 19 wherein the spatial directions approximate evenly-spaced locations on a sphere or dome.

25. The subject illumination data gathering apparatus of claim 19 wherein the small light is substantially white.

26. The subject illumination data gathering apparatus of claim 19 including a plurality of cameras, each for taking a photograph of the subject when illuminated from each spatial direction from a viewpoint different from the viewpoint photographed by the other cameras.

27. The subject illumination data gathering apparatus of claim 26 wherein said recorder also records information indicative of the identity of the camera that took each photograph.

28. The subject illumination data gathering apparatus of claim 19 wherein said lighting apparatus includes a plurality of strobe lights and a D.C power supply for supplying pulses of D.C. power to each of said strobe lights.

29. The subject illumination data gathering apparatus of claim 19 further including subject-stabilizing apparatus for helping the subject remain still during the photographing.

30. The subject illumination data gathering apparatus of claim 29 wherein said subject-stabilizing apparatus includes a headrest.

31. Computer-readable media containing computer programming instructions which, when loaded in a computer system, cause the computer system to render a subject illuminated as if at a location in a scene by combining subject illumination data specifying the appearance of the subject when illuminated from a plurality of different spatial directions with scene illumination data specifying the illumination that the scene provides at the location at which the subject is to be illuminated from a plurality of spatial directions.

* * * * *

UNITED STATES PATENT AND TRADEMARK OFFICE
CERTIFICATE OF CORRECTION

PATENT NO.         : 6,685,326 B2
APPLICATION NO. : 10/165371
DATED              : February 3, 2004
INVENTOR(S)        : Paul E. Debevec et al.

Page 1 of 1

It is certified that error appears in the above-identified patent and that said Letters Patent is hereby corrected as shown below:

Please add the following heading and paragraph at column 1, line 5:

GOVERNMENT'S INTEREST IN APPLICATION

This invention was made with government support under Contract No. DAAD 19-99-D-0046 awarded by the United States Army. The government has certain rights in the invention.

Signed and Sealed this

Second Day of June, 2009

JOHN DOLL
*Acting Director of the United States Patent and Trademark Office*